Nov. 24, 1959 R. MILLERSHIP ET AL 2,914,757

APPARATUS FOR GENERATING CODED PATTERNS OF ELECTRIC PULSES

Filed Nov. 2, 1953

INVENTORS:

RONALD MILLERSHIP
AND
CHARLES EDWARD OWE

Bailey, Stephens & Huettig
ATTORNEYS 2,914,757
Patented Nov. 24, 1959

2,914,757

APPARATUS FOR GENERATING CODED PATTERNS OF ELECTRIC PULSES

Ronald Millership and Charles Edward Owen, Stanmore, England

Application November 2, 1953, Serial No. 389,807

4 Claims. (Cl. 340—347)

Figure 1:
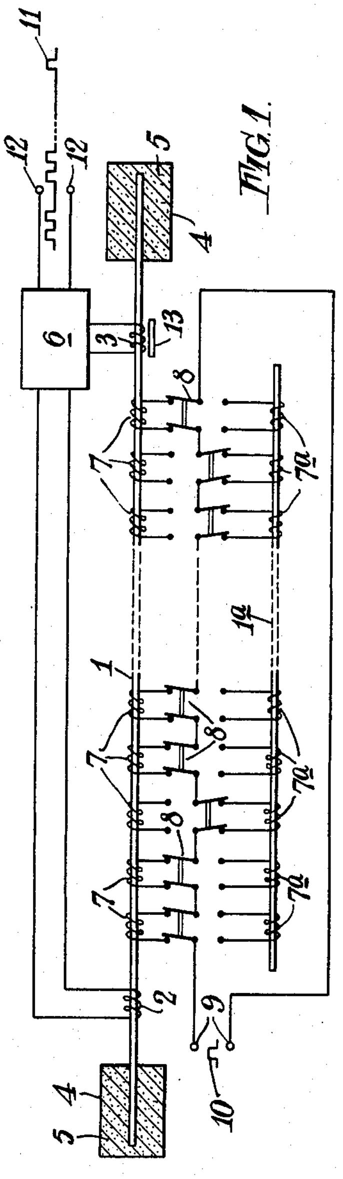

This invention relates to apparatus for generating coded patterns of electric pulses and, while being generally applicable to electrical systems handling information in the form of trains of voltage pulses, will probably be most useful in its application to electronic digital computing apparatus in which information is represented by binary numbers. In such apparatus, the computing operations are controlled by particular patterns of pulses coded to represent numbers and the present invention provides improved means for generating such numbers and introducing them into the computing apparatus.

It is frequently desirable that such computing apparatus shall be furnished with a "memory," i.e. means whereby digital information may be stored until required, and a particular type of "memory" comprises a delay line along which trains of pulses travel comparatively slowly and in which they may be stored indefinitely by arranging that pulses arriving at the output end of the line are amplified and, after suitable regeneration or re-shaping, re-introduced at the input end of the line. A delay line of this character has been described in the specification of co-pending application Serial No. 303,552, now Patent No. 2,790,160, issued April 23, 1957, and consists of a length of thin wire or tape composed of a material having an appreciable magnetostriction and coupled electromagnetically at its ends to an input circuit and an output circuit, respectively. When a pulse of current passes in the input circuit the magnetisation of that part of the wire or tape coupled to the circuit is changed and, because of the phenomenon of magnetostriction, the dimensions of this part are also changed. An acoustic pulse is thus launched in the wire or tape and travels along the same with a velocity determined by the characteristics of the material of the wire or tape. On its arrival at the part of the wire or tape coupled to the output circuit, the small changes in the magnetisation of this part which are associated with the passage of the acoustic pulse therethrough induce voltages in the output circuit. The time delay, T, between the electrical input and output pulses is determined by the length, $l$, of the wire or tape and the velocity, $v$, of propagation of the acoustic pulses in the latter, for $l=vT$.

Now, the present invention utilises magnetostrictive lines of a similar character to those just briefly described in order to generate coded patterns or trains of electric pulses.

According to the invention, apparatus for generating coded patterns or trains of electric pulses comprises a length of a thin wire, tape or the like composed of a material having an appreciable magnetostriction, a plurality of input circuits each electromagnetically coupled to one of a number of parts of the wire or the like which are spaced apart along the length thereof by distances each determined by the product of the spacing in time between successive possible pulse positions in the trains of pulses to be produced and the velocity of propagation of acoustic pulses in the magnetostrictive material, means for simultaneously passing a pulse of current through one or more selected input circuits, and an output circuit electromagnetically coupled to a further part of the wire or the like which is spaced from an endmost one of said number of parts.

When, as is usually the case, the possible pulse positions in a train are spaced uniformly in time at $\tau$ seconds apart, the input circuits are themselves spaced uniformly along the length of the wire or the like at $v\tau$ feet apart, $v$ being the velocity in feet per second of the propagation of acoustic pulses in the wire or the like. Upon the energisation of any selected combination of such circuits simultaneously by a pulse of current, there will be launched in the wire or the like a corresponding series of acoustic pulses which will cause the production in the output circuit of a like series of voltage pulses.

It is preferred to connect the output circuit, via suitable pulse shaping and amplifying circuits, to the most remote of the input circuits, or to an additional such circuit disposed in advance of the same, so that any information inserted into the delay line constituted by the wire or the like will be continuously recirculated in the storage loop thus established and may be retained for an indefinite period of time ready for use when required.

In most cases it is advantageous to arrange that those portions of the wire or the like which are coupled to the input or output circuits have a suitable standing magnetisation so that output pulses of the optimum shape and amplitude may be obtained. This magnetisation may be provided by small solenoids or permanent magnets or may be remanent magnetisation in the wire or the like itself.

Figure 2:
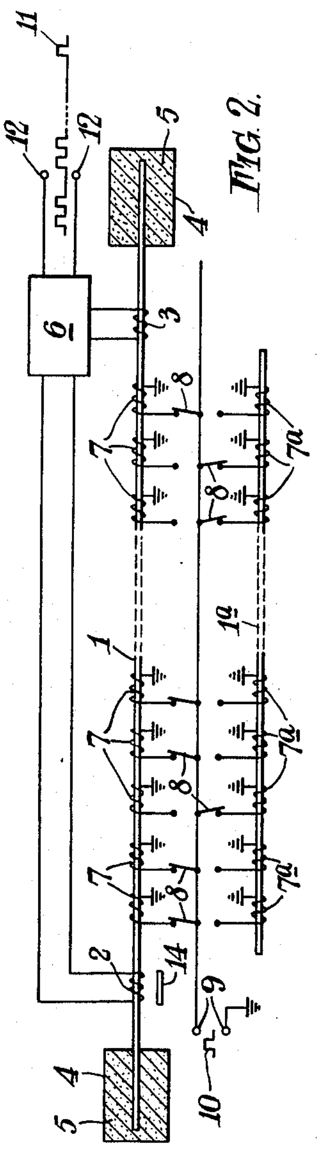

The following description will make clear the way in which the invention may be carried into practical effect, this being given by way of example only with reference to the accompanying drawings in which:

Figure 1 is a schematic circuit diagram of one arrangement according to the invention, and Figure 2 is a schematic circuit diagram of another such arrangement.

In both the arrangements illustrated in Figures 1 and 2 a number or order generator for supplying predetermined numbers or instructions in binary code to an electronic digital computer comprises a length 1 of nickel wire having electromagnetically coupled to its "input" and "output" ends two coils of wire indicated at 2 and 3 respectively. The length of the wire 1 is such as to produce a total delay which is not less than the total time to be occupied by the information to be supplied, and the wire 1 is suitably terminated at each end in means such as the sleeves 4 filled with grease 5 to suppress reflections at these ends.

The output coil 3 is connected by way of suitable pulse shaping and amplifying circuits indicated by the rectangle 6 to the input coil 2 so that the nickel wire 1 forms part of a closed loop in which binary numbers can circulate in the form of trains of pulses.

Along the length of the wire 1 are arranged digit input coils 7 electromagnetically coupled to corresponding parts of the wire 1 which are uniformly spaced apart by a distance $v\tau$, the number of such coils 7 corresponding to the maximum number of possible digit positions in the information to be introduced. These digit input coils 7 are arranged so that they may be connected by means of switches 8, either in series as shown in Figure 1 or in parallel as shown in Figure 2, to a pair of input terminals 9, so that a pulse of current 10 applied across the input terminals 9 may be passed simultaneously through any selected number of the input coils 7 at selected locations along the length of the wire 1.

In order to introduce a particular number or instruction such as, for example, the binary number 1101—001 into the computing apparatus, only those digit input coils 7 corresponding in position to those digit positions in the required number or instruction at which the binary digit 1 is to appear are connected by their associated switches 8 to the input terminals 9. The remaining digit input coils 7, which correspond to those digit positions in the required number or instruction at which the binary digit 0 is to appear, are not connected across the input terminals 9. The pulse of current 10 is then applied across the input terminals 9 and passes simultaneously through all the connected digit input coils 7, whereupon a train of acoustic pulses corresponding to the number or information which is to be introduced is launched in the nickel wire 1. This train travels through the wire 1 and as it passes along the portion thereof which is electromagnetically coupled with the output coil 3, there is produced in the output circuit a train of voltage pulses 11 representing, in serial form, the binary information required. These voltage pulses 11 are produced across a pair of output terminals 12 connected to amplifying circuits indicated at 6.

By reason of the connection between the output and input coils 2 and 3, this information will continue to circulate in the closed loop as a train of pulses which are electrical in the portion of the loop comprising the output coil 3, the pulse shaping and applifying circuits 6, and the input coil 2, and are acoustic in the portion of the loop comprising the nickel wire 1. The information is thus available to the computing apparatus as required.

In order to avoid changes in the amplitude of the pulses with changes in the number of binary digits 1 in the information to be introduced (due to changes in the number of digits input coils 7 connected across the terminals 9), it is preferred to arrange that when a digit input coil 7 is left disconnected as described above, a dummy coil 7*a* of as nearly as possible the same electrical characteristics is connected in its stead. These dummy coils are conveniently, as illustrated, arranged on an identical delay line 1*a*, consisting of a nickel wire, disposed alongside the first, the switches 8 being suitable to bring about the selection of the operative digit-input coils 7 appropriate to the information to be introduced. It may also be necessary to vary the coupling between the respective digit input coils 7 and the nickel wire 1 in a manner which will be understood, in order to compensate for the greater attenuation undergone by those pulses which have further to travel in the wire 1.

Those portions of the wire 1 which are coupled to the input and output coils 2 and 3 respectively are advantageously arranged to have a suitable standing magnetisation so that output pulses of optimum shape are obtained. This magnetisation may be provided by means of permanent magnets such as the magnet 13 shown associated with the output coil 3 in Figure 1 or the magnet 14 shown associated with the input coil 2 in Figure 2. It will be appreciated that a permanent magnet may be associated with both the input coil 2 and the output coil 3 if desired. It will be understood that the standing magnetisation may be provided by small solenoids or that it may be remanent magnetisation in the wire itself.

The apparatus according to the invention may be employed to supply information in digital form to any electrical system adapted to handle information in the form of trains of voltage pulses. In particular, in the case of an electronic digital computer embodying delay line storage of the character described above, the order generator of this invention may conveniently be combined with one of the existing storage loops so that the information may be injected directly into the store of the computer. To this end the input coils 7 may be associated with a length of wire corresponding to the wire 1 illustrated, which length of wire normally forms part of the storage loop of the store.

It will be understood that although the wire 1 has been illustrated as being straight this wire may be arranged in a spiral or other suitable manner.

It will also be understood that the input coil 2 may be omitted in which case the output from the pulse shaping and amplifying circuits 6 may be connected to the digital input coil 7 remote from the output coil 3 to achieve the closed loop whereby the information may be stored until required.

What we claim is:

1. Apparatus for generating a train of electric pulses coded to represent information, comprising a delay line composed of a length of material having an appreciable magnetostriction, a plurality of digit input circuits each electro-magnetically coupled to a different part of the delay line and adapted when traversed by a pulse of electric current to generate an acoustic pulse in the associated part of said line, which parts are uniformly spaced apart along the length of said line, a dummy delay line composed of a length of a material similar to that of said delay line and a plurality of dummy input circuits corresponding in number to the number of digit input circuits and each electromagnetically coupled to parts of said dummy delay line, input terminals, switch means operable to connect any selected number of said digit input circuits to said input terminals and to connect a selected one of said dummy input circuits to said input terminals for each of said digit input circuits not so connected so that a voltage pulse applied at these input terminals will cause a pulse of current to flow through each connected circuit, an output circuit electromagnetically coupled to a further part of said delay line disposed nearer to an end of said line than any of said different parts thereof and adapted to have a pulse of electric current generated therein upon the passage of an acoustic pulse along said further part of said delay line, means for applying a voltage pulse at said input terminals to cause the generation of an acoustic pulse in each part of said delay line which is associated with a digit input circuit connected to said input terminals, the acoustic pulses travelling along the line to said end thereof as a coded train of pulses, and means for taking off from said output circuit the coded train of voltage pulses consequently appearing across the same.

2. Apparatus for generating a train of electric pulses according to claim 1 in which the switch means is operable to connect said selected number of said digit input circuits and said selected dummy input circuits in series with each other across said input terminals.

3. Apparatus for generating a train of electric pulses according to claim 1 in which the switch means is operable to connect said selected number of said digit input circuits and said selected dummy input circuits in parallel with each other across said input terminals.

4. Apparatus for generating a train of electric pulses according to claim 1 including a further input circuit electromagnetically coupled to a part of said delay line disposed between said different parts thereof and the end thereof remote from said end, an electrical connection between said output circuit and said further input circuit, and means for applying the coded train of pulses taken off from said output circuit to said further input circuit via said electrical connection.

References Cited in the file of this patent

UNITED STATES PATENTS

| | | |
|---|---|---|
| 2,401,094 | Nicholson | May 28, 1946 |
| 2,495,740 | Labin et al. | Jan. 31, 1950 |
| 2,498,306 | Stedman et al. | Feb. 21, 1950 |
| 2,629,827 | Eckert et al. | Feb. 24, 1953 |
| 2,635,229 | Gloess et al. | Apr. 14, 1953 |
| 2,717,372 | Anderson | Sept. 6, 1955 |
| 2,736,881 | Booth | Feb. 28, 1956 |